July 4, 1950     A. M. O'LEARY     2,513,584
COUPLING FIXTURE FOR PNEUMATIC TIRE WHEELS
Filed May 18, 1945     2 Sheets—Sheet 1
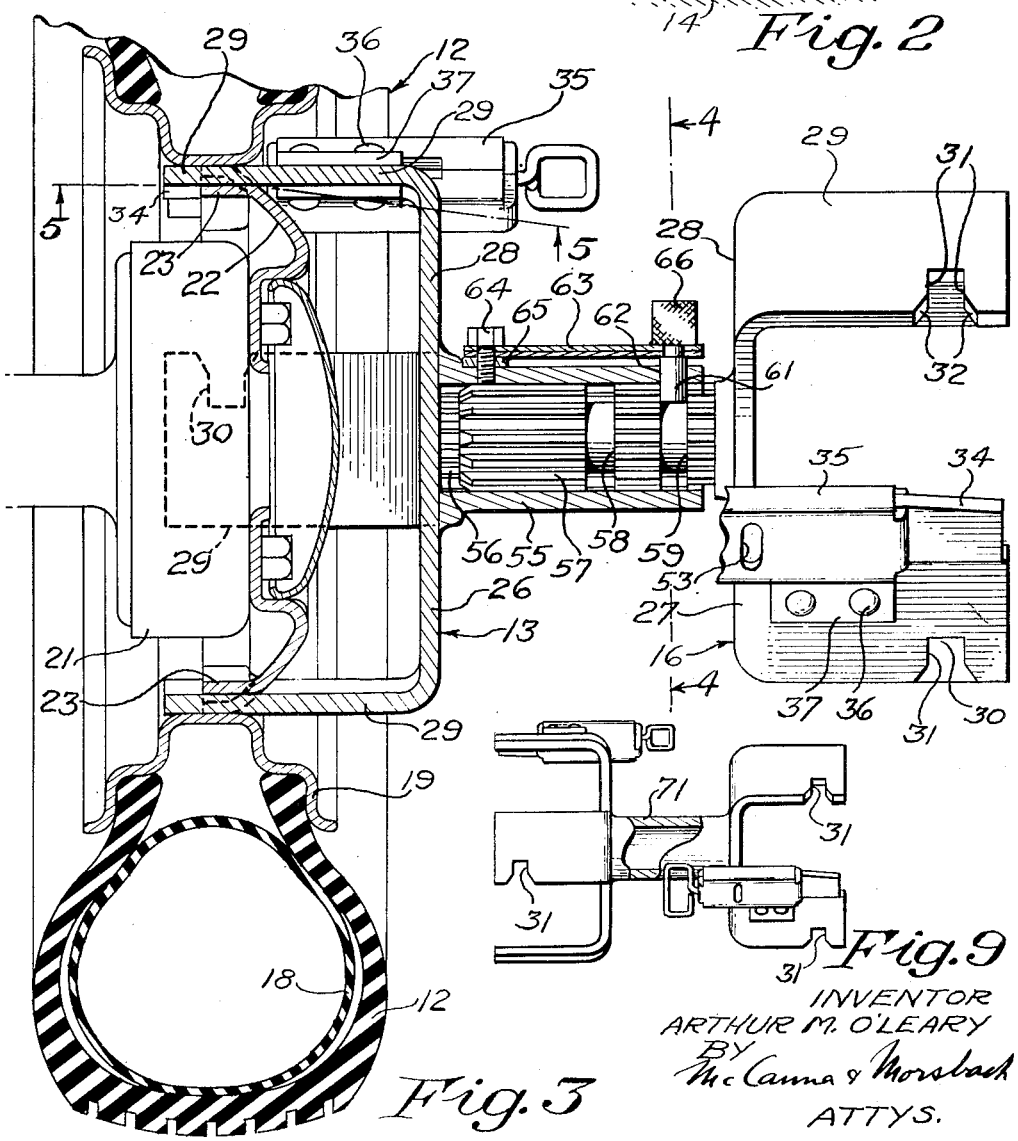
INVENTOR
ARTHUR M. O'LEARY
BY
McCanna & Morsbach
ATTYS.

July 4, 1950          A. M. O'LEARY          2,513,584
COUPLING FIXTURE FOR PNEUMATIC TIRE WHEELS
Filed May 18, 1945          2 Sheets-Sheet 2
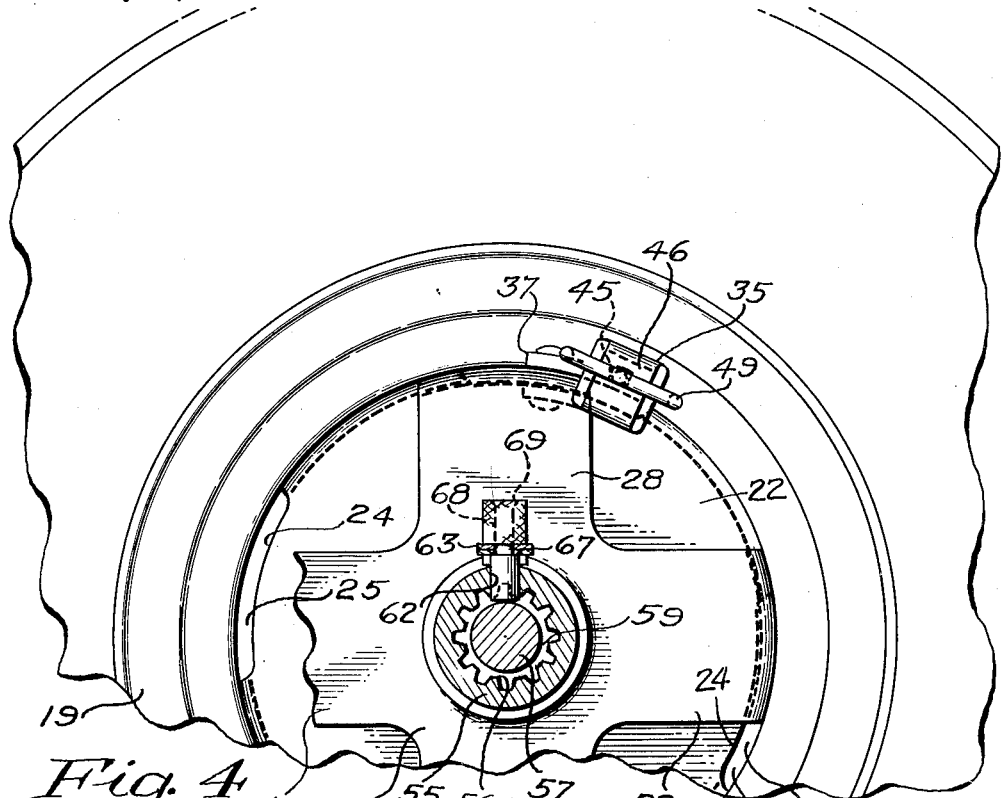
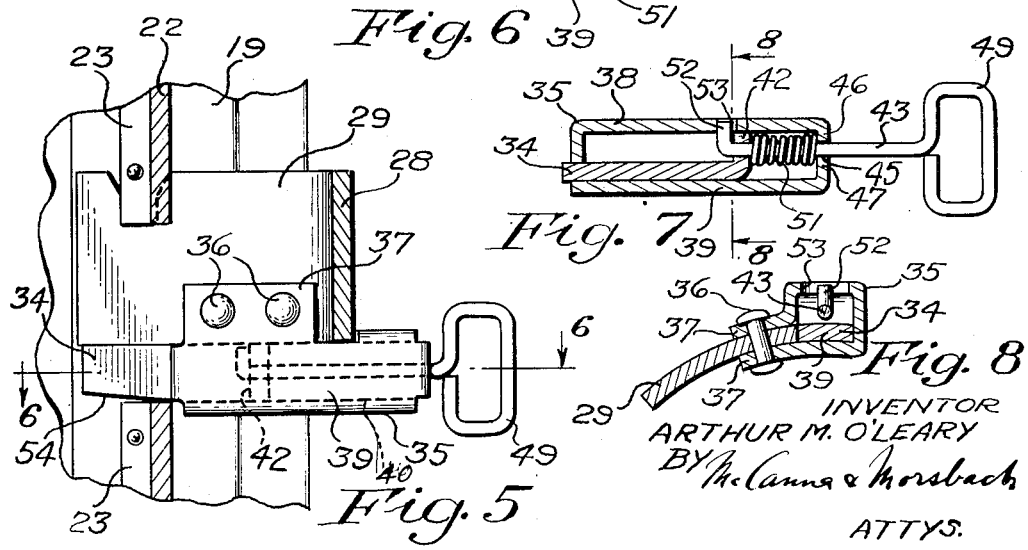
INVENTOR
ARTHUR M. O'LEARY
BY McCanna & Morsbach
ATTYS.

Patented July 4, 1950

2,513,584

UNITED STATES PATENT OFFICE 2,513,584

COUPLING FIXTURE FOR PNEUMATIC TIRE WHEELS

Arthur M. O'Leary, Oak Park, Ill.

Application May 18, 1945, Serial No. 594,419

12 Claims. (Cl. 301—38)

This invention relates to the problem incident to accidental deflation of a pneumatic tire for a vehicle wheel, of how to make the desired tire repair or replacement with the least loss of time and without the necessity of calling a service car for making immediate repair of the tire.

The present invention aims to provide a satisfactory solution by the provision of a novel wheel coupling fixture for quickly and easily coupling to the deflated tire wheel, an auxiliary or replacement wheel and tire which is preferably similar to the mounted wheel and tire. Thus, the deflated tire wheel is not disturbed from its mounting and my invention provides for carrying the vehicle temporarily on the replacement wheel and tire until repair of the deflated tire may be conveniently made.

More particularly, it will be observed that wheels for automotive vehicles are commonly constructed with webs of pressed or drawn metal to connect the hubs to the rims or tire-supporting elements. Continuity of a web's periphery is broken by a series of scallops providing, with the wheel rim, a series of uniformly spaced apertures or slots. A characteristic contemplated by the present invention is the use to which these slots are put in coupling two wheels, preferably of similar size and construction, together by a fixture comprising a connecting beam provided at each end with a spider having arms extending radially of the beam, and terminating in end-portions adapted to enter the slots where the end-portions are locked in rigid adherence with the respective wheel web.

Another object of the invention is to incorporate in the coupling fixture two connector beams which are easy of assembly into a unitary member to space the spiders, and thus provide two distinct composite sections, adaptable of rigid association with each other. In this embodiment the spiders may be spaced apart different distances, for reasons noted hereinafter.

Another object of the invention is to provide means for renewing the capacity of a vehicle to proceed on its way, in case of accidental tire deflation, without the necessity of an actual change of tires; to quickly renew the load-carrying capacity by supplementary addition of a replacement wheel and tire; to make it possible for the load-carrying capacity to be renewed by people of less mechanical skill, and to increase the supporting capacity of vehicle wheels, particularly on soft road surfaces.

An illustrative embodiment of the invention is shown in the accompanying drawings, in which:

Figure 1 is a view showing one of the wheels of an automotive vehicle, in elevation, to which a section of the fixture has been attached in accordance with my invention, an automobile jack being in place for raising the wheel;

Figure 2 is a view similar to the previous view showing the wheel, elevated by the jack, and having a replacement wheel coupled to the mounted wheel by the entire coupling fixture, in accordance with my invention;

Figure 3 is a fragmentary view, on an enlarged scale, showing the fixture, in side elevation, parts being broken away to reveal other parts;

Figure 4 is a vertical section on line 4—4 of Figure 3;

Figure 5 is a section taken on line 5—5 of Figure 3;

Figure 6 is a section taken on line 6—6 of Figure 5;

Figure 7 is a view, similar to Figure 6, showing the key in retracted position;

Figure 8 is a section taken on line 8—8 of Figure 7; and

Figure 9 is a view, in side elevation, showing a second embodiment of the invention, a part being broken away to indicate the structure thereof.

In Figures 1 and 2 the reference character 11 is used to denote an automotive vehicle which has been temporarily incapacitated by a deflated tire 12. A section 13 of the coupling fixture is attached to the wheel and a jack 14 is applied in readiness for exerting upward pressure against the section preparatory to attachment of a replacement wheel. The deflated tire 12 having been raised from the road surface a replacement wheel 15 is attached to the wheel of said tire 12 by means of a second section 16. After the jack has been removed the vehicle is supported by the replacement wheel 15.

The coupling fixture is adapted to rigidly couple together wheels of the kind referred to as disc wheels and shown in detail in Figures 3 and 4. Elements of such a wheel assembly include a tire 12, inner tube 18, rim 19, and brake drum 21 attached to the rim by a web 22. The periphery of the web is provided with flanges or feet 23, riveted or otherwise fixed to the rim. Scallop-like openings 24, of uniform length and spacing occurring between the feet provide, with the rim, a series of slots 25.

Mechanism of the coupling fixture includes means for detachable connection through said slots 25 to edges of the wheel web. Such means involves use of a pair of spiders 26 and 27, respectively. The spiders are of star-shaped construction and may be duplicates of each other. They may be suitably formed, as by being struck from metal plates or sheet metal of uniform thickness. The spiders include arms 28 which are bent to provide end-portions 29, parallel with the axes of said spiders, and from which they are uniformly spaced. The end-portions of each spider arm are arcuate in cross-section and the convex side thereof is on an arc the radius of which approximates the radius of the cylindrical surface of the rim in association with the flange 23. The width of each end-portion is slightly less than the length of one of the slots 25; that is, only sufficiently less to permit ready passage of the end-portion through the slot. Each end-portion is uniformly notched laterally thereof at 30, to provide a web-engaging jaw surface 31. On rotating the spider slightly about its axis the jaw-surfaces assume a position embracing the web at the ends of the slots (Figures 4 and 5), and may be guided to this position by cam surfaces 32.

Locking mechanism is provided for maintaining the jaw-surfaces in embracement with a web. This is necessary since separation of wheel from fixture would follow displacement of the surfaces 31 from the web. Rotation of the spider counterclockwise (Figure 4) leaves an open space 33 between the end-portion 29 of each spider arm and the adjacent end of the slot 25 in which it is engaged. I have provided means whereby if one of the spaces 33 be plugged, displacement of all the jaw-surfaces from engagement with web can be avoided. This means comprises a filler or gib 34, of effective width, and thickness substantially equal to the thickness of the arms 28, slidably associated with one of the end-portions 29. Although but one gib per spider is shown in the drawing it is clear that a gib may be mounted in association with two or more of the arms.

In this embodiment the gib is housed in a casing 35, preferably formed from sheet metal looped about the gib and anchored to an end-portion 29 in any convenient manner, as by rivets 36 passing through ears 37, integral with the casing, and embracing the end-portions 29 (Figure 3). The gib is adapted to slide between an upper wall 38 and a lower 39, and is kept in contact with the end-portion 29 by a side wall 40. At one end of the casing a lug 41 extends downwardly from the upper wall 38 to provide, with lower wall 39, an opening 42' through which the gib is adapted to slide, and also provides means for restraining said gib from vertical movement. Internally of the casing the gib is further restrained from vertical play by an upwardly extending arm or lug 42, slidably contacting the upper wall 38.

In coupling a spider to a web it is essential that the gib 34 be retracted before the end-portions 29 are inserted in the slots 25. This is conveniently accomplished by means of a key 43, passing through the lug 42. The key also passes through an opening 45 which is located between wall portions 46 and 47, as shown in Figure 7. The key is further provided with a looped portion or handle 49. Normally the gib is resiliently maintained in extended position (Figures 5 and 6) by a compression spring 51, coiled about the key. At one end thereof the spring presses the lug 42 against a laterally bent arm or stop 52 on the key 43. At the opposite end the spring is resisted by said wall portions 46 and 47. When the fixture is not in use the spring pushes the gib to a point slightly to the left of the position shown in Figure 5, further movement being limited by the handle 49 in contact with said wall portions 46 and 47. When the coupling is about to be attached to a wheel the gib is retracted by pulling the handle to the right (Figure 7), against the resistance of the spring, until the stop 52 is opposite an elongated aperture or slot 53 in the wall 38. The key is then rotated through a quarter turn, at which time stop 52 is brought into engagement with the slot (Figures 7 and 8) and in which position the spring is retained from expansion. Turning the handle through another quarter turn permits release of the spring and extension of the gib. In order to more effectively engage the slotted portions 30 of the respective spider arms with the slotted portions 24 of the wheel web, I have tapered the outer edge 54 of the gib 34 (Figure 5) so that this tapered edge will have a wedging action against the adjacent end of the web slot.

Means are provided for adjustably coupling the spiders together. In the center section 13 a hub member 55 is attached to the spider 26 in any convenient manner such as by welding. This hub member is tubular and internally splined at 56 to receive therein an externally splined stud member 57, complementary with the hub spline. The stud 57 extends from the spider 27, to which it is also rigidly connected in any suitable manner such as by welding. The members 55 and 57 are mounted on the spiders with their axes coaxial with the axes of the spiders. Rotary adjustment of one spider relative to the other spider is therefore easy of attainment.

Provision is also made for spacing the spiders from each other and locking them in a selected position. This is effected by means of annular grooves 58 and 59, of substantially greater depth than the depth of the splined teeth on shaft 57, and a lock bolt 61, adaptable of engagement with either of the grooves. The lock bolt is slidably mounted in a hole 62 in the hub member 55, and is normally retained in said hole by a suitable leaf spring 63. The spring is clamped to the hub 55 by a cap screw 64 and spaced slightly from said shaft by a washer 65. At the free end thereof the spring is suitably fixed to the lock bolt, as by being clamped between a knurled handle 66 and a shoulder 67 on the lock bolt, the latter having a reduced cross-section 68 passing through the handle to which the section is secured by a head 69 riveted on the section.

From the foregoing it will be apparent that in the event of deflation of a tire the coupling section 13 may be applied to the wheel of the deflated tire in the manner shown in Figure 1. In this position the coupling section is securely locked to the wheel by means of the interlocking engagements between the spider arms and wheel structure as above described. Also, the hub part 55 of the coupling is so constructed and arranged as to provide an effective means for lifting the mounted deflated wheel by means of a jack. When the wheel has been sufficiently raised, the coupling section 16 will be applied in the manner shown in Figure 2. Preferably, the coupling section 16 is applied to the replacement tire and wheel 15 prior to its application to the coupling section 13. The coupling section 16 may be set in either of two positions in spaced relation to the coupling section 13 as provided by the lock bolt 61 which may be engaged in either groove 58 or 59. These selected positions are provided to give different spacing between the coupling sections and particularly to provide a wider spacing when the coupling fixture is applied to a front wheel. This wider spacing provides greater clearance between the replacement tire and the adjacent vehicle structure such as the fender. The narrow spacing would be utilized for rear wheel applications and also for front wheels where the vehicle structure permits. In either case the coupling sections are in driving connection one with the other through means of the spline teeth or the equivalent. Thus, the auxiliary or replacement wheel serves to carry the vehicle and it serves as a driving wheel or a steering wheel, as the case may be. It will be apparent that by means of this invention a vehicle may be driven temporarily until it is convenient to make the proper repair or replacement of the deflated tire. It will also be apparent that the coupling fixture may be quickly and easily applied without the necessity of special tools other than an ordinary lifting jack.

In Figure 9 a second embodiment of the invention includes a pair of spiders of construction identical with the spiders of the previously described embodiment. In this construction, however, a single hub member 71 is employed to space the spiders from each other and to fixedly tie them together in coaxial relationship with each other. With proper spacing of the spiders this embodiment is adapted for both rear and front wheels. This is a simplified form of the invention in which the spaced spider couplings constitute a unitary structure.

My invention in its broader aspect contemplates the provision of opposed sets of spider arms shaped for interlocking connection with the web slots of a vehicle wheel and connected in rigid operative relation by means such as a hub portion which has the further function of providing a lifting member for application of a jack thereto. In the practice of my invention equivalent means may be provided for interlocking the spider arms to the wheel webs. Also, suitable means may be used, if desired, for maintaining the spider arms against displacement from the interlocking engagement with the wheel webs, where such engagement is effected by relative movement of the spider arms with respect to the wheel webs.

While I have shown several embodiments of my invention, it will be understood that I do not wish to be limited thereto since many modifications may be made, and I therefore contemplate by the appended claims to cover any such modifications as fall within the true spirit and scope of my invention.

I claim:

1. The combination with a mounted wheel having a web and slots at the periphery of said web and an emergency wheel also having a web and slots at the periphery thereof of a wheel coupling fixture comprising, a pair of spiders between the webs, said spiders having arms extending into the slots, means for locking the arms in the slots, a coupling member on each of the spiders, one of said members being tubular and adapted to receive therewithin the other member whereby the coupling members are associated in coacting relation to support the emergency wheel in coacting relation with the mounted wheel, and means for retaining the coupling members in said coacting relation.

2. The combination with a mounted wheel having a web and slots at the periphery of said web and an emergency wheel also having a web and slots at the periphery thereof of a wheel coupling fixture comprising, a pair of spiders between the webs, said spiders having arms extending into the slots, means for locking the arms in the slots, a coupling member on each of the spiders, one of said members being tubular and shaped to receive therewithin in driving connection therewith the other coupling member, and means for positively maintaining the members against axial displacement relative to each other in any one of a plurality of positions.

3. The combination with a pair of pneumatic tire wheels having webs and slots at the peripheries of said webs, of a wheel coupling fixture for releasably coupling the wheels together comprising a tubular hub member and a second hub member slidable within the first mentioned hub member, means for maintaining the hub members in rigid axial adjustment relative to each other, means for maintaining the hub members in rigid rotary adjustment relative to each other, a spider on the outer end of each hub member, said spiders having arms radial of the hub members and terminating in straight end portions extending through the slots, said end-portions having web-receiving notches laterally thereof and providing jaw surfaces embracing the webs, and means for releasably maintaining the jaw surfaces in embracement with said webs.

4. The combination with a pair of pneumatic tire wheels having webs and slots at the peripheries of said webs, of a wheel coupling mechanism for releasably coupling the wheels together comprising a hub structure adapted for application thereto of a lifting jack, a spider on each end of the hub structure, each spider having radial arms terminating in straight end-portions extending through the slots, said end-portions having web-receiving notches laterally thereof and providing jaw surfaces embracing the webs, and gib means for releasably maintaining the jaw surfaces in embracement with said webs.

5. The combination set forth in claim 4 including spring pressed means acting in connection with the gib means for urging the gib means into said jaw surface embracement action.

6. The combination with a pair of pneumatic tire wheels having webs and slots at the peripheries of said webs, of a wheel coupling mechanism for releasably coupling the wheels together comprising a hub structure adapted for application thereto of a lifting jack, a spider on each end of the hub structure, each spider having radial arms terminating in straight end-portions extending through the slots, said end portions having web-receiving notches laterally thereof and providing jaw surfaces embracing the webs, means including gibs in slidable association with the end-portions, guides for maintaining the jaw surfaces in embracement with said webs, springs for maintaining the gibs in operative position, and means for retracting the gibs from operative position so that the end portions may be disengaged from embracement with the webs.

7. The combination with an emergency tire and wheel and a vehicle mounted deflated tire wheel, each wheel having circumferentially spaced slots at the periphery of its web of a wheel coupling fixture, comprising a hub structure to which a lifting jack may be applied, means on each end of the hub structure provided with circumferentially spaced arms shaped to enter the wheel slots and have interlocking driving engagement therewith, and means for locking the inserted arms in said driving connection to the wheel webs.

8. The combination with an emergency tire and wheel and a vehicle mounted deflated tire wheel, each wheel having circumferentially spaced slots in its web adjacent to the rim, of a wheel coupling fixture comprising a pair of coupling members each having circumferentially spaced arms shaped to be inserted into said wheel slots and having means for interlocking said arms to the wheel, a hub member connecting the coupling members in spaced relation so that said members constitute a driving unit, the hub member providing means for application of a lifting jack thereto for raising the deflated vehicle wheel and for positioning the outermost coupling member to receive the inflated tire emergency wheel, the emergency wheel being applied to the outer circumfrentially spaced arms of the fixture for interlocking connection thereto, the coupling fixture serving, when said jack is removed, as a vehicle support intermediate the deflated tire wheel and the emergency wheel and also serving as a driving unit between said wheels.

9. A coupling fixture for mounting an emergency wheel provided with circumferential spaced web openings on a vehicle mounted wheel similarly provided with circumferentially spaced web openings, comprising a central coupling and lifting hub, coupling arms projecting outwardly from each end of said hub, the arms at one end of said hub being provided with circumferentially spaced ends engageable with the web openings of one of said wheels and the arms at the other end of said hub being provided with circumferentially spaced ends engageable with the web openings in the other of said wheels, and means for releasably locking said arm ends in said openings.

10. A coupling fixture for mounting an emergency wheel on a vehicle mounted wheel, each of said wheels having a disc web provided with circumferentially spaced slots in its peripheral portion, said coupling fixture comprising a central coupling and lifting hub, coupling arms projecting outwardly from each end of said hub, the arms at one end of said hub being provided with circumferentially spaced ends insertable into the web slots of one of said wheels and the arms at the other end of said hub being provided with circumferentially spaced ends insertable into the web slots in the other of said wheels, said arm ends each having a portion adapted for interlocking engagement with the web of the associated wheel, and means for releasably holding said portions of said arm ends interlocked with said wheel webs.

11. A coupling fixture for mounting an emergency wheel on a vehicle mounted wheel, each of said wheels having a disc web provided with circumferentially spaced slots in its peripheral portion, said coupling fixture comprising a central coupling and lifting hub, coupling arms projecting outwardly from each end of said hub, the arms at one end of said hub being provided with circumferentially spaced ends insertable into the web slots of one of said wheels and the arms at the other end of said hub being provided with circumferentially spaced ends insertable into the web slots in the other of said wheels, said arm ends each having a slotted portion adapted for interlocking engagement with the web of the associated wheel in response to relative rotation of the associated wheel and said hub, and means for releasably holding said slotted portions of said arm ends interlocked with said wheel webs.

12. A coupling fixture for mounting an emergency wheel provided with circumferential spaced web openings on a vehicle mounted wheel similarly provided with circumferentially spaced web openings, comprising a central coupling and lifting hub, said hub including two telescopically related members which are axially adjustable to vary the length of said hub, coupling arms projecting outwardly from each end of said hub, the arms at one end of said hub being provided with circumferentially spaced ends engageable with the web openings of one of said wheels and the arms of the other end of said hub being provided with circumferentially spaced ends engageable with the web openings in the other of said wheels, and means for releasably locking said arm ends in said openings.

ARTHUR M. O'LEARY.

REFERENCES CITED

The following references are of record in the file of this patent:

UNITED STATES PATENTS

| Number | Name | Date |
|---|---|---|
| 861,618 | Stocking | July 30, 1907 |
| 1,287,620 | Benson | Dec. 17, 1918 |
| 1,428,556 | Putnam | Sept. 12, 1922 |
| 1,854,636 | Westbrook | Apr. 19, 1932 |
| 1,887,538 | Bond | Nov. 15, 1932 |
| 2,202,398 | Poppenga | May 28, 1940 |